United States Patent
Ochi et al.

(10) Patent No.: US 6,506,348 B1
(45) Date of Patent: *Jan. 14, 2003

(54) HEAVY OIL FIRED BOILER EXHAUST GAS TREATMENT APPARATUS

(75) Inventors: Eiji Ochi, Tokyo (JP); Takeo Shinoda, Tokyo (JP); Toru Takashina, Hiroshima (JP); Masakazu Onizuka, Hiroshima (JP)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,239

(22) Filed: Nov. 10, 1998

(30) Foreign Application Priority Data

Nov. 10, 1997 (JP) .................................. 9-306684

(51) Int. Cl.[7] .......................... B01D 50/00; B01D 47/00; B01D 53/14; B03C 3/00
(52) U.S. Cl. ....................... 422/169; 422/168; 422/169; 422/224; 95/195; 95/196; 95/197; 95/199; 95/200; 95/202; 95/57; 96/54; 96/28; 96/15; 96/134
(58) Field of Search ................. 422/168, 169, 422/224; 95/195, 196, 197, 199, 200, 202, 57; 96/54, 28, 15, 134

(56) References Cited

U.S. PATENT DOCUMENTS

| | | | | |
|---|---|---|---|---|
| 3,782,888 A | * | 1/1974 | Cnare ............................ | 432/14 |
| 3,960,687 A | | 6/1976 | Bakke et al. | |
| 4,297,332 A | * | 10/1981 | Tatani et al. ............. | 423/240 R |
| 4,305,909 A | * | 12/1981 | Willett et al. ................ | 422/169 |
| 4,919,696 A | * | 4/1990 | Higashi et al. ................ | 55/269 |
| 5,015,443 A | * | 5/1991 | Ito et al. ...................... | 422/186 |
| 5,525,317 A | | 6/1996 | Bhat et al. | |
| 5,958,335 A | * | 9/1999 | Okazoe et al. ................. | 422/13 |
| 6,007,783 A | * | 12/1999 | Ochi et al. ................... | 422/171 |

FOREIGN PATENT DOCUMENTS

JP   08243340   9/1996

OTHER PUBLICATIONS

European Search Report for EP 98 12 1004 completed Jul. 5, 1999.

* cited by examiner

Primary Examiner—Jerry D. Johnson
Assistant Examiner—Alexa A. Doroshenk
(74) Attorney, Agent, or Firm—Alston & Bird LLP

(57) ABSTRACT

There is provided a heavy oil fired boiler exhaust gas treatment apparatus which removes soot and dust and $SO_3$ in the heavy oil fired boiler exhaust gas efficiently at a low cost without using an excessively large apparatus. The treatment apparatus comprises a charging device 3 provided at the inlet of an absorption tower of a wet type exhaust gas desulfurizer 4 and neutralizer pouring means A provided on the upstream side of the charging device 3 to pour a neutralizer into exhaust gas and neutralize $SO_3$ in the exhaust gas.

18 Claims, 3 Drawing Sheets

HEAVY OIL FIRED BOILER EXHAUST GAS TREATMENT APPARATUS

BACKGROUND OF THE INVENTION

The present invention relates to a heavy oil fired boiler exhaust gas treatment apparatus.

Conventionally, as shown in FIG. 4, as a treatment method for $SO_3$ in exhaust gas of a heavy oil fired boiler 401, there has generally been used a method in which a salt such as ammonium sulfate ($(NH_4)_2SO_4$) is yielded by pouring a neutralizer such as ammonia on the upstream side of an electric dust collector 402, and the $SO_3$ is trapped together with soot and dust by the electric dust collector 402. The exhaust gas passes through a wet type exhaust gas desulfurizer 403 and is discharged from a stack 405. When far higher dust removing performance is required, a wet type electric dust collector 404 is installed on the downstream side of the wet type exhaust gas desulfurizer 403 to effect high-level dust removal.

However, a neutralizing salt yielded by the pouring of a neutralizer consists of fine particles, so that it is difficult to trap the neutralizing salt by the electric dust collector 402 and an absorption tower of the desulfurizer 403. Further, since ammonium sulfate is trapped as part of soot and dust together with soot and dust in the electric dust collector 402, the capacity of the electric dust collector 402 must be increased. Therefore, the conventional method poses a problem in that not only the site area but also the installation cost and operation cost increase.

Thereupon, a heavy oil fired boiler exhaust gas treatment apparatus which solves above problems has been desired.

SUMMARY OF THE INVENTION

The present invention has been made in view of the above situation, and accordingly an object thereof is to provide a heavy oil fired boiler exhaust gas treatment apparatus which removes soot and dust and $SO_3$ in the heavy oil fired boiler exhaust gas efficiently at a low cost without using an excessively large apparatus.

To solve the above problems, the present invention provides a heavy oil fired boiler exhaust gas treatment apparatus comprising a charging device provided at the inlet of an absorption tower of a wet type exhaust gas desulfurizer and neutralizer pouring means provided on the upstream side of the charging device for pouring a neutralizer into exhaust gas and for neutralizing $SO_3$ in the exhaust gas.

Also, the present invention provides a heavy oil fired boiler exhaust gas treatment apparatus comprising an electric dust collector for collecting dust in exhaust gas sent from a heavy oil fired boiler, neutralizer pouring means provided on the upstream side of the electric dust collector for pouring a neutralizer into the exhaust gas and for neutralizing $SO_3$, and a wet type exhaust gas desulfurizer, wherein a charging device is provided at the inlet of an absorption tower of said wet type exhaust gas desulfurizer.

In a heavy oil fired boiler exhaust gas treatment apparatus according to the present invention, an accelerating dust collector may be provided at the outlet of the absorption tower.

In a heavy oil fired boiler exhaust gas treatment apparatus according to the present invention, there may be provided a spray for spraying water into the exhaust gas on the upstream side of an accelerating dust collector.

In a heavy oil fired boiler exhaust gas treatment apparatus according to the present invention, there may be provided separator for separating unburned carbon from an absorbent liquid obtained from the absorption tower.

In a heavy oil fired boiler exhaust gas treatment apparatus according to the present invention, there may be provided means for separating and recovering a neutralizer in an absorbent liquid drawn from an oxidation tank of the wet type exhaust gas desulfurizer.

In a heavy oil fired boiler exhaust gas treatment apparatus according to the present invention, a high-pressure spray may be provided immediately behind the charging device.

As is apparent from the above description, according to the present invention, there is provided a heavy oil fired boiler exhaust gas treatment apparatus which removes soot and dust and $SO_3$ in the heavy oil fired boiler exhaust gas efficiently at a low cost without using an excessively large apparatus.

That is, according to the present invention, by installing a charging device, soot and dust (containing a neutralizing salt such as ammonium sulfate) are charged. Further, by installing a high-pressure (pressurized) spray, tiny water drops can be sprayed, by which fine particles can be agglomerated and enlarged. Thereby, soot and dust can be trapped in the absorption towers with high efficiency.

When an accelerating dust collector is installed, soot and dust can be recovered efficiently, so that an electric dust collector, which requires a high cost, can be omitted or made compact.

Further, when a liquid cyclone and means for separating and recovering a neutralizer are installed, unburned carbon and neutralizer trapped in the absorption towers can be recovered, so that the usage can be reduced. Therefore, the heavy oil fired boiler exhaust gas treatment apparatus can be improved as a whole.

DETAILED DESCRIPTION OF THE PREFERRED EMBODIMENT

An exhaust gas to which the present invention is applied is the exhaust gas discharged from a heavy oil fired boiler. The heavy oil fired boiler is a boiler which uses heavy oil as a main fuel.

As a heavy oil, three types specified in JIS K-2205-1980, which is the standard for heavy oil, are particularly typical. A "heavy oil" includes residual oils obtained by distilling a crude oil, petroleum residues obtained by extracting a crude oil with a solvent, and tar pitch obtained as a by-product in the process of decomposition reaction of crude oil such as thermal and catalytic decompositions. In addition, coal based oils such as liquefied coal oils and solvent extracts from coals and bitumens such as sand oil and shale oil are also included. These materials are characterized in common by high boiling points, appearance as blackish brown or black liquid, semi-solid or solid in some cases, and ability of being dissolved in strong solvents such as pyridine and quinoline, by which they are differentiated from a coal. Since the exhaust gas contains $SO_3$, it is necessary to perform treatment therefor.

Figure 1:
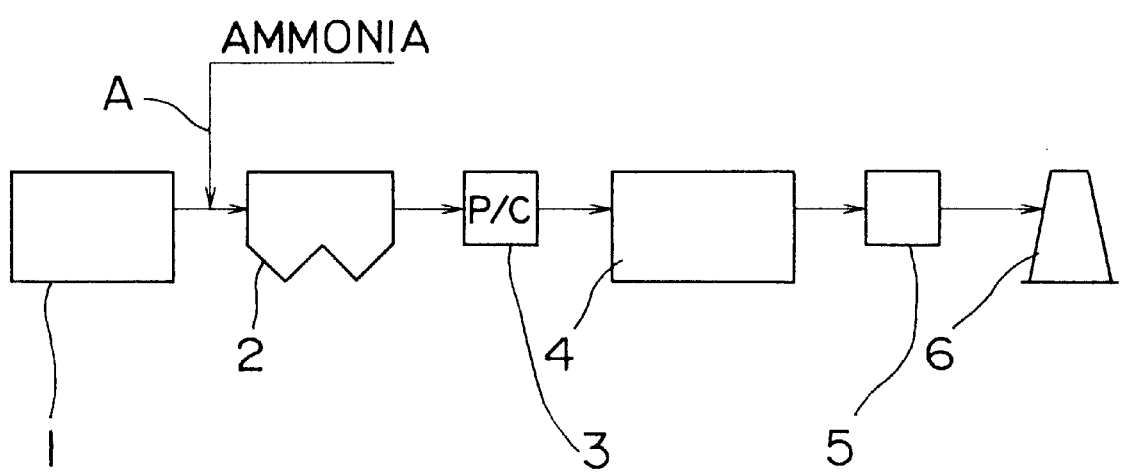
FIG. 1 is a block diagram for illustrating one embodiment of a heavy oil fired boiler exhaust gas treatment apparatus in accordance with the present invention.

FIG. 1 schematically shows one embodiment of a heavy oil fired boiler exhaust gas treatment apparatus in accordance with the present invention.

In this embodiment, ammonium sulfate (($NH_4)_2SO_4$) is yielded by pouring ammonia as a neutralizer into an exhaust gas of a heavy oil fired boiler 1 through a line A on the upstream side of an electric dust collector 2, and the ammonium sulfate is trapped together with soot and dust by the dry type electric dust collector 2. The exhaust gas is fed into a later-stage wet type exhaust gas desulfurizer 4 through a charging device 3. The exhaust gas having passed through the wet type exhaust gas desulfurizer 4 passes through an accelerating dust collector 5, and is discharged from a stack 6.

Figure 2:
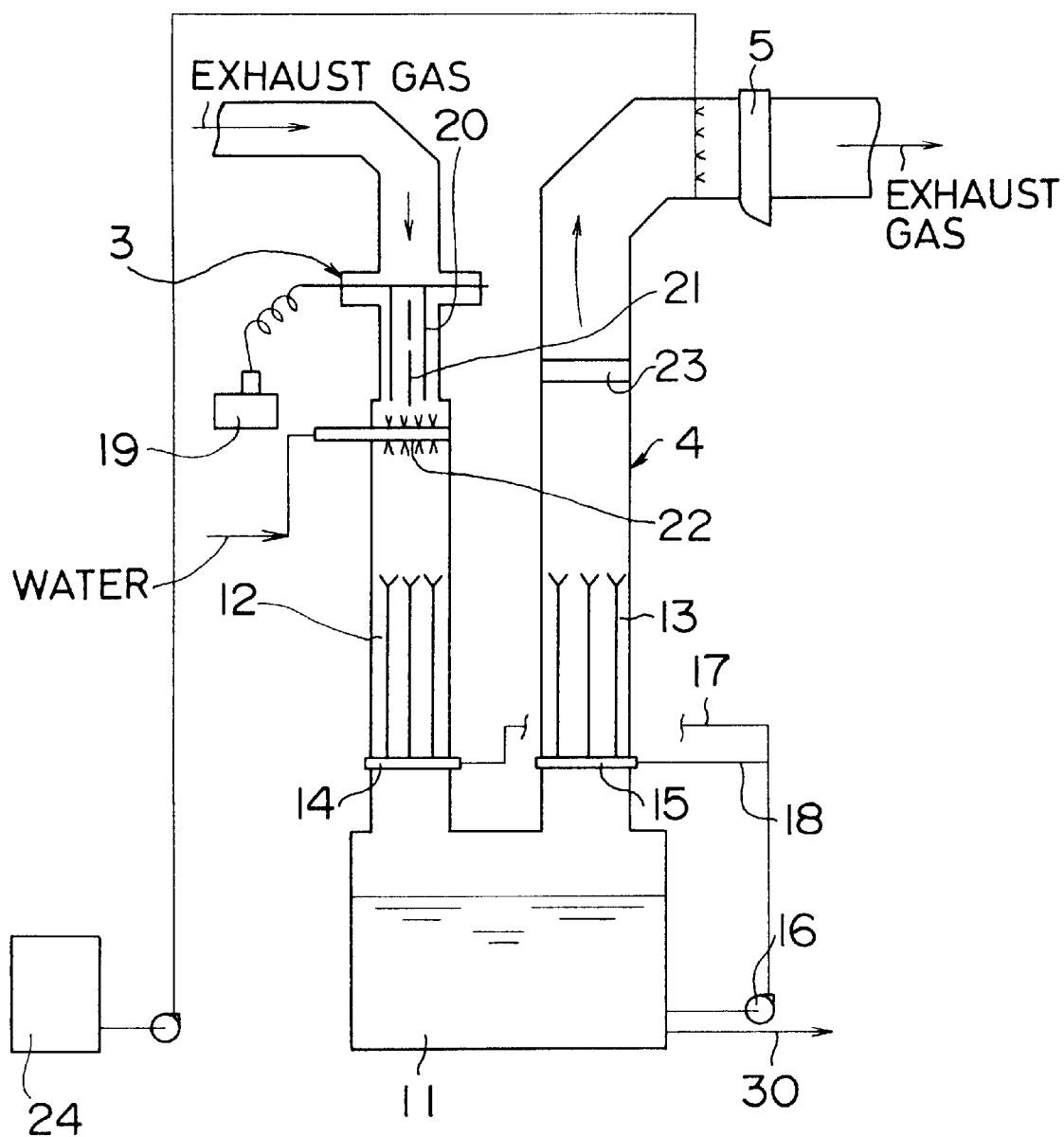
FIG. 2 is a schematic view for mainly illustrating a charging device, high-pressure spray, and wet type exhaust gas desulfurizer for one embodiment of a heavy oil fired boiler exhaust gas treatment apparatus in accordance with the present invention.

FIG. 2 schematically shows the charging device 3 and the wet type exhaust gas desulfurizer 4. This wet type exhaust gas desulfurizer 4 is a device using a parallel counterflow type gas-liquid contact device. This desulfurizer 4 includes an oxidation tank 11 supplied with an absorbent liquid in which an absorbent consisting of limestone is suspended (hereinafter called absorbent slurry), a liquid column type inlet-side absorption tower 12 which is provided extendedly upward from one side of the oxidation tank 11 to effect gas-liquid contact between untreated exhaust gas and the absorbent slurry in the oxidation tank 11, and a liquid column type outlet-side absorption tower 13 which is provided extendedly upward from the other side of the oxidation tank 11 to again effect gas-liquid contact between the exhaust gas led from the inlet-side absorption tower 12 and the absorbent slurry in the oxidation tank 11.

The inlet-side absorption tower 12 is a so-called parallel flow type absorption tower in which untreated exhaust gas is led from the above and flows downward. Also, the outlet-side absorption tower 13 is a so-called counterflow type absorption tower in which the exhaust gas flows upward.

The absorption towers 12 and 13 are provided with a plurality of spray pipes 14 and 15 arranged in parallel, respectively. These spray pipes 14 and 15 each are formed with a plurality of nozzles for injecting the absorbent slurry upward in a liquid column form.

On the outside of the oxidation tank 11, there is provided a circulating pump 16 for sucking the absorbent slurry in the oxidation tank 11, by which the absorbent slurry is fed to the spray pipes 14 and 15 via circulating lines 17 and 18, respectively, and is injected upward from the nozzles.

Although not shown in the figure, the oxidation tank 11 can be provided with an arm rotating type air sparger. This air sparger blows air for oxidation as minute bubbles into the absorbent slurry in the oxidation tank 11 while agitating the absorbent slurry. Thus, the absorbent slurry having absorbed $SO_2$ and the air are brought into contact with each other efficiently in the oxidation tank 11, whereby the whole quantity is oxidized to obtain gypsum.

In this wet type exhaust gas desulfurizer 4, the absorbent slurry is injected from the spray pipes in the absorption towers 12 and 13, and flows down while absorbing $SO_2$ by the gas-liquid contact with exhaust, gas and also while trapping soot and dust (containing ammonium sulfate). The absorbent slurry comes into contact with many air bubbles generated as described above, being oxidized, and further causes neutralization reaction to yield a slurry containing much gypsum.

In this embodiment, the flow path cross-sectional area of the outlet-side absorption tower 13 is set relatively larger than that of the inlet-side absorption tower 12. Thereby, in the inlet-side absorption tower, a high flow velocity of exhaust gas is achieved, so that soot and dust are trapped effectively. On the other hand, in the outlet-side absorption tower 13, a high gas-liquid contact capacity is assured, so that $SO_2$, is absorbed especially effectively.

The charging device 3, which offers one feature of the present invention, is installed on the upstream side of the above-described wet type exhaust gas desulfurizer 4. In this embodiment, as shown in FIG. 2, the charging device 3 includes a charging electrode 20 and a dust collecting electrode plate 21. Under the experimental conditions given in Table 1, a negative voltage is applied to the charging electrode 20 so that the current density of the dust collecting electrode plate 21 is 0.5 to 6 $mA/m^2$ by using a power source 19. Thereby, soot and dust are trapped on the dust collecting electrode plate 21. The agglomerated and enlarged soot and dust are knocked out of the dust collecting electrode plate 21 to the absorption towers 12 and 13 by hammering. Because the particle size has been increased, the soot and dust can be trapped easily by the absorbing section.

TABLE 1

| | | |
|---|---|---|
| Treatment gas flow rate | 5,000–10,000 | $m^3N/h$ |
| Exhaust gas temperature | 105–120 | ° C. |
| Water content | 7–11 | vol % |
| Concentration of soot and dust | 20–70 | $mg/m^3N$ (d) |
| Pressurized spray flow rate | 0–520 | l/h |
| Circulation flow rate (parallel flow) | 0–165 | $m^3N/h$ |
| Circulation flow rate (counterflow) | 0–224 | $m^3N/h$ |

On the other hand, the minute soot and dust having not been trapped on the dust collecting electrode plate 21 are also charged by the charging device 3. Tiny water drops (0.1 to 0.5 mm) are sprayed by using a high-pressure (pressurized) spray 22 (d=about 100 $\mu$m) installed immediately behind the charging device 3. Thereby, the charged soot and dust are trapped by the tiny water drops by being subjected to an electrical attracting force caused by the image charge of tiny water drops. The tiny water drops having trapped soot and dust are trapped easily with high efficiency in the absorption towers 12 and 13 by inertial collision and interruption effect. Thereby, the soot and dust which have not been removed by the dry electric dust collector 2 can be trapped by the absorption towers 12 and 13 with high efficiency.

Since ammonium sulfate, which constitutes part or sometimes most of the soot and dust, is water-soluble, it dissolves in the absorbent slurry in the oxidation tank 11, and is ionized to ammonium ion and $SO_4$ ion.

Thus, in the oxidation tank 11, a large quantity of gypsum, a small quantity of limestone, which is an absorbent, and soot and dust (containing ammonium ions and $SO_4$ ions produced by the dissolution of ammonium sulfate) trapped from the exhaust gas are normally suspended or dissolved. The absorbent slurry in the oxidation tank 11 is sent to the later-described solid-liquid separation side through a piping line 30.

During the operation, the oxidation tank 11 is supplied with limestone, which is an absorbent, as slurry from a slurry regulating tank (not shown). The absorbent is supplied appropriately to the oxidation tank by using a slurry pump or the like. Also, the oxidation tank 11 is supplied with make-up water appropriately, by which the water decreased gradually by evaporation in the absorption towers 12 and 13 is supplemented.

During the operation, the flow rate of the make-up water to the oxidation tank 11, the flow rate of the slurry drawn through the piping line 30, etc. are regulated, whereby the slurry containing a predetermined concentration of gypsum and absorbent is accumulated in the oxidation tank 11 within a level of a fixed range.

Also, during the operation, in order to keep the efficient $SO_X$ removal and to keep high gypsum purity, the boiler load (flow rate of exhaust gas), the $SO_2$ concentration in untreated exhaust gas, the pH in the oxidation tank 11, the concentration of limestone, etc. are detected by using sensors. Based on these detection results, the supply amount of limestone to the oxidation tank 11 and other factors are appropriately controlled by a controller (not shown).

In this embodiment, mist flowing out from the absorbing section is removed by a mist catcher 23.

Further, in this embodiment, an accelerating dust collector 5 is installed additionally at the outlet of the absorption tower. The accelerating dust collector 5 narrows the ordinary mist catcher passage width, by which the inertia force of mist is increased by the increased fluid flow velocity to enhance the collision dust removal performance. In this accelerating dust collector 5 as well, the mist containing the untrapped soot and dust is caught. Further, by spraying water into the exhaust gas on the upstream side of the accelerating dust collector 5, water saturated gas is made in a supercooled state, whereby the water in excess gas is condensed around fine particles to enlarge minute soot and dust. Therefore, the dust removal performance can be enhanced by the treatment using a higher inertia force. The spray water is supplied from a spray water tank 24. By adding this accelerating dust collector 5, dust removal performance equivalent to that in the case where a wet type electric dust collector is installed can be obtained. Thereby, high dust removal performance can be obtained without the installation of a wet type electric dust collector. Also, the electric dust collector 2 can be omitted or made compact.

Figure 3:
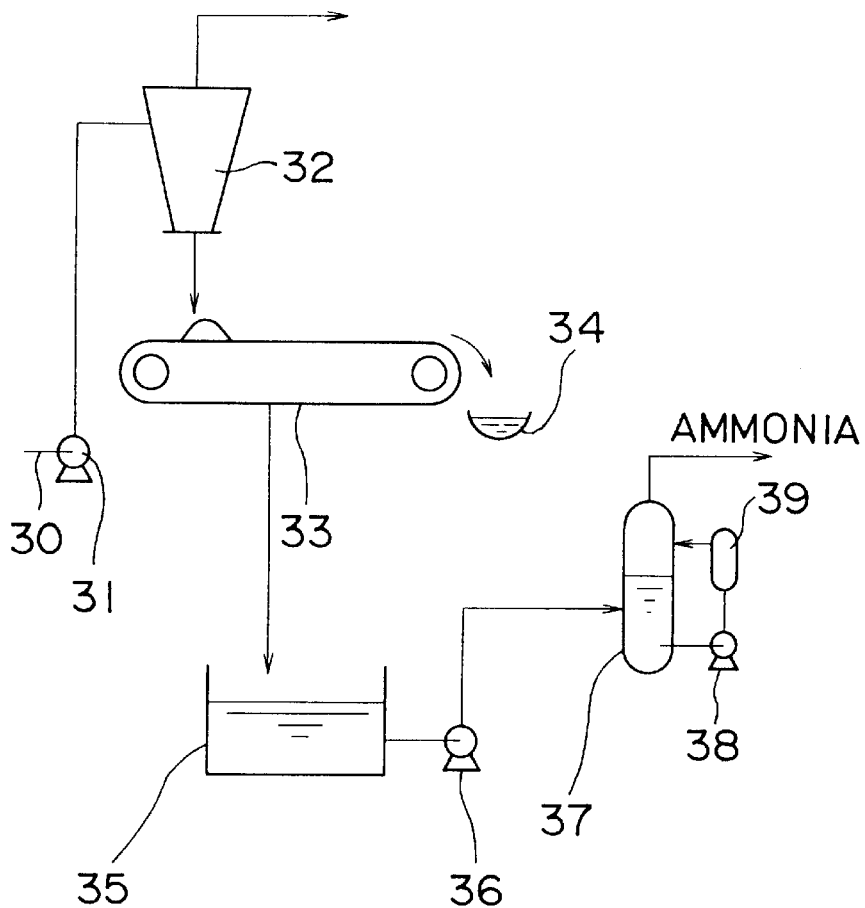
FIG. 3 is a schematic view for mainly illustrating a liquid cyclone and means for evaporating, separating and recovering ammonia for one embodiment of a heavy oil fired boiler exhaust gas treatment apparatus in accordance with the present invention.
Figure 4:
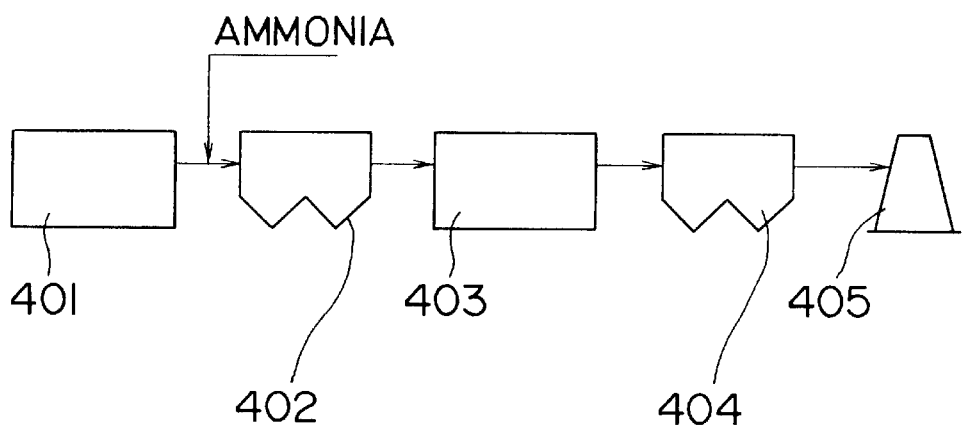
FIG. 4 is a block diagram for illustrating one mode of a conventional heavy oil fired boiler exhaust gas treatment apparatus.

In this embodiment, the absorbent slurry is drawn to a treatment system as shown in FIG. 3 and treated.

The absorbent slurry is drawn by a pump 31, and floatation separation of unburned carbon from the absorbent slurry is effected by a liquid cyclone 32, which is a separator. The absorbent slurry from which unburned carbon has been separated is separated into gypsum and liquid component by a belt filter 33. The gypsum is recovered by a recovery conveyor 34. The liquid component is stored in a recovery tank 35, and is sent to an evaporator 37 by using a pump 36. The liquid component is drawn by using a pump 38 and heated by a heater 39, whereby the contained ammonia is separated by evaporation and recovered. The recovered ammonia is reused as ammonia for pouring.

Thus, by effecting the floatation separation of unburned carbon from the absorbent slurry by the liquid cyclone 32, the gypsum purity can be ensured. Also, by reusing the recovered unburned carbon, the amount of fuel usage can be reduced.

Further, the ammonia in the absorbent slurry is separated by evaporation by an evaporator 37 or the like equipment and recovered, by which the consumption of ammonia can be kept low.

Other Embodiments

Each of the aforementioned absorption tower is not necessarily limited to a liquid column type absorption tower. For example, a simple spray type or fill type absorption tower may be employed. However, the liquid column type absorption tower, which has appreciably high dust removal performance, is superior to other types in the case where large quantities of soot and dust are contained in the exhaust gas.

As the neutralizer, NaOH, calcium carbonate, or the like can be used besides ammonia.

The liquid cyclone 32 may be any other device for separating unburned carbon.

In addition to the above embodiment, all modifications, alterations, and additions which are obvious to those skilled in the art are included in the technical scope of the present invention.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No. 9-306684 filed on Nov. 10, 1997 including specification, claims, drawings and summary are incorporated herein by reference in its entirety.

What is claimed is:

1. A heavy oil fired boiler exhaust gas treatment apparatus of the type in which boiler exhaust gas is passed through a wet type exhaust gas desulfurizer including an absorption tower having an inlet and an outlet, wherein the boiler exhaust gas flows through the apparatus such that the boiler exhaust gas is introduced into the absorption tower via the inlet of the absorption tower and exits the absorption tower via the outlet of the absorption tower, comprising:

a charging device positioned in the inlet of the absorption tower and being operable to electrically charge particulates contained in the boiler exhaust gas, wherein the inlet of the absorption tower is within the absorption tower, whereby the charging device is positioned within the absorption tower, a supplying apparatus disposed upstream of said charging device for supplying a neutralizer into the boiler exhaust gas and for neutralizing $SO_3$ in the boiler exhaust gas; and an accelerating dust collector adapted to be connected to the outlet of said absorption tower.

2. The apparatus according to claim 1, further comprising at least one nozzle disposed on an upstream side of the accelerating dust collector for spraying water into the boiler exhaust gas on the upstream side of the accelerating dust collector.

3. The apparatus according to claim 1, wherein the wet type exhaust gas desulfurizer includes an oxidation tank the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

4. A heavy oil fired boiler exhaust gas treatment apparatus of the type in which boiler exhaust gas is passed through a wet type exhaust gas desulfurizer including an absorption tower having an inlet and an outlet, wherein the boiler exhaust gas flows through the apparatus such that the boiler exhaust gas is introduced into the absorption tower via the inlet of the absorption tower and exits the absorption tower via the outlet of the absorption tower, comprising:

a charging device positioned in the inlet of the absorption tower and being operable to electrically charge particulates contained in the boiler exhaust gas, wherein the inlet of the absorption tower is within the absorption tower, whereby the charging device is positioned within the absorption tower;

a supplying apparatus disposed upstream of said charging device for supplying a neutralizer into the boiler exhaust gas and for neutralizing $SO_3$ in the boiler exhaust gas; and a separator for separating unburned carbon from an absorbent liquid obtained from said absorption tower.

5. The apparatus according to claim 4, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

6. A heavy oil fired boiler exhaust gas treatment apparatus of the type in which boiler exhaust gas is passed through a wet type exhaust gas desulfurizer including an absorption tower having an inlet and an outlet, wherein the boiler exhaust gas flows through the apparatus such that the boiler exhaust gas is introduced into the absorption tower via the inlet of the absorption tower and exits the absorption tower via the outlet of the absorption tower, comprising:

a charging device positioned in the inlet of the absorption tower and being operable to electrically charge particulates contained in the boiler exhaust gas, wherein the inlet of the absorption tower is within the absorption tower, whereby the charging device is positioned within the absorption tower;

a supplying apparatus disposed upstream of said charging device for supplying a neutralizer into the boiler exhaust gas and for neutralizing $SO_3$ in the boiler exhaust gas; and a separating system for separating and recovering a neutralizer in an absorbent liquid drawn from said wet type exahust gas desulfurizer.

7. The apparatus according to claim 6, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

8. A heavy oil fired boiler exhaust as treatment apparatus of the type in which boiler exhaust gas is passed through a wet type exhaust gas desulfurizer including an absorption tower having an inlet and an outlet, wherein the boiler exhaust gas flows through the apparatus such that the boiler exhaust gas is introduced into the absorption tower via the inlet of the absorption tower arid exits the absorption tower via the outlet of the absorption tower, comprising:

a charging device positioned in the inlet of the absorption tower and being operable to electrically charge particulates contained in the boiler exhaust gas, wherein the inlet of the absorption tower is within the absorption tower, whereby the charging device is positioned within the absorption tower;

a supplying apparatus disposed upstream of said charging device for supplying a neutralizer into the boiler exhaust gas and for neutralizing $SO_3$ in the boiler exhaust gas; and a high-pressure spray disposed immediately downstream said charging device and operable to create water droplets which trap particulates in the boiler exhaust gas which are not trapped by the charging device.

9. The apparatus according to claim 8, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

10. A heavy oil fired boiler exhaust gas treatment apparatus comprising an electric dust collector for collecting dust in boiler exhaust gas sent from a heavy oil fired boiler, a supplying apparatus disposed upstream of said electric dust collector and operable for supplying a neutralizer into the boiler exhaust gas to neutralize $SO_3$ in the boiler exhaust gas, a wet type exhaust gas desulfurizer having an absorption tower which receives boiler exhaust gas that has passed trough the electric dust collector, a charging device positioned in an inlet of the absorption tower of said wet type exhaust gas desulfurizer, and an accelerating dust collector adapted to be connected to an outlet of said absorption tower of said wet type exhaust gas desulfurizer wherein the boiler exhaust gas flows through the apparatus such that the boiler exhaust gas is introduced into the absorption tower via the inlet of the absorption tower and exits the absorption tower via the outlet of the absorption tower, and wherein the inlet of the absorption tower is within the absorption tower, whereby the charging device is positioned within the absorption tower.

11. The apparatus according to claim 10, further comprising at least one nozzle disposed on an upstream side of the accelerating dust collector for spraying water into the boiler exhaust gas on the upstream side of the accelerating dust collector.

12. The apparatus according to claim 10, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

13. A heavy oil fired boiler exhaust gas treatment apparatus comprising an electric dust collector for collecting dust in boiler exhaust gas sent from a heavy oil fired boiler; a supplying apparatus disposed upstream of said electric dust collector and operable for supplying a neutralizer into the boiler exhaust gas to neutralize $SO_3$ in the boiler exhaust gas; a wet type exhaust gas desulfurizer having an absorption tower which receives boiler exhaust gas that has passed through the electric dust collector; a charging device positioned in an inlet of the absorption tower of said wet type exhaust gas desulfurizer, wherein the boiler exhaust gas flows through the apparatus such that the boiler exhaust gas is introduced into the absorption tower via the inlet of the absorption tower and exits the absorption tower via an outlet of the absorption tower; and a separating system for separating and recovering a neutralizer in an absorbent liquid drawn from said wet type exhaust gas desulfurizer, wherein the inlet of the absorption tower is within the absorption tower, whereby the charging device is positioned within the absorption tower.

14. The apparatus according to claim 13, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up-draft section is downstream from the down-draft section with respect to the flow of the boiler, exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

15. A heavy oil fired boiler exhaust gas treatment apparatus comprising an electric dust collector for collecting dust in boiler exhaust gas sent from a heavy oil fired boiler; a supplying apparatus disposed upstream of said electric dust collector and operable for supplying a neutralizer into the boiler exhaust gas to neutralize $SO_3$ in the boiler exhaust gas; a wet type exhaust gas desulfurizer having an absorption tower which receives boiler exhaust gas that has passed through the electric dust collector; a charging device positioned in an inlet of the absorption tower of said wet type exhaust gas desulfurizer, wherein the boiler exhaust gas flows through the apparatus such that the boiler exhaust gas is introduced into the absorption tower via the inlet of the absorption tower and exits the absorption tower via an outlet of the absorption tower; and a high-pressure spray disposed immediately downstream from said charging device and operable to create water droplets which hap particulates in the boiler exhaust gas which are not trapped by the charging device, wherein the inlet of the absorption tower is within the absolution tower, whereby the charging device is positioned within the absorption tower.

16. The apparatus according to claim 15, wherein the wet type exhaust gas desulfurizer includes an oxidation tank; the absorption tower of the wet type exhaust gas desulfurizer includes a down-draft section and an up-draft section; the down-draft section extends upright from the oxidation tank and is operative so that the boiler exhaust gas flows downwardly therethrough; the up -draft section is downstream from the down-draft section with respect to the flow of the boiler exhaust gas, extends upright from the oxidation tank, and is operative so that the boiler exhaust gas flows upwardly therethrough; the inlet of the absorption tower is proximate an upper end of the down-draft section; and the outlet of the absorption tower is proximate an upper end of the up-draft section, whereby the charging device is positioned in the down-draft section.

17. A heavy oil fired boiler exhaust gas treatment apparatus, comprising:
   a wet type exhaust gas desulfurizer including:
      an absorption tower positioned above an oxidation tank, with the absorption tower including:
         a down-draft section that is in communication with the oxidation tank, extends upright from the oxidation tank, and is operative so that the boiler exhaust gas flows downwardly therethrough, and
         an up-draft section that is in communication with the oxidation tank, is downstream from the down-draft section with respect to the flow of the boiler exhaust gas, extends upright from the oxidation tank, and is operative so that the boiler exhaust gas flows upwardly therethrough, and
      a charging device positioned in the down-draft section of the absorption tower and being operable to electrically charge particulates contained in the boiler exhaust gas; and
   a supplying apparatus positioned upstream, with respect to the flow of the boiler exhaust gas, of said charging device and for supplying a neutralizer into the boiler exhaust gas, so as to neutralize, $SO_3$ in the exhaust gas.

18. The apparatus according to claim 17, further comprising an electric dust collector positioned upstream, with respect to the flow of the boiler exhaust gas, from the wet type exhaust gas desulfurizer.

* * * * *

UNITED STATES PATENT AND TRADEMARK OFFICE
CERTIFICATE OF CORRECTION

PATENT NO. : 6,506,348 B1
DATED : January 14, 2003
INVENTOR(S) : Ochi et al.

It is certified that error appears in the above-identified patent and that said Letters Patent is hereby corrected as shown below:

Column 6,
Line 58, after "tank" insert a semicolon (;).

Column 8,
Line 10, "as" should read -- gas --;
Line 16, "arid" should read -- and --.
Line 26, after "and" begin a new sub-paragraph;
Line 27, after "downstream" insert -- from--;
Line 54, "trough" should read -- through --.

Column 9,
Line 47, after "boiler" cancel the comma (,).

Column 10,
Line 11, "hap" should read -- trap --;
Line 14, "absolution" should read -- absorption --;
Line 22, "up -draft" should read -- up-draft --;
Line 53, after "neutralize" cancel the comma (,).

Signed and Sealed this

Third Day of June, 2003

JAMES E. ROGAN
*Director of the United States Patent and Trademark Office*